United States Patent
Han et al.

(10) Patent No.: US 10,680,783 B2
(45) Date of Patent: Jun. 9, 2020

(54) METHOD AND APPARATUS FOR TRANSMITTING UPLINK CONTROL SIGNAL

(71) Applicant: ZTE CORPORATION, Guangdong (CN)

(72) Inventors: Xianghui Han, Guangdong (CN); Shuqiang Xia, Guangdong (CN); Bo Dai, Guangdong (CN); Wen Zhang, Guangdong (CN); Jing Shi, Guangdong (CN); Min Ren, Guangdong (CN)

(73) Assignee: ZTE CORPORATION, Guangdong, CA (US)

(*) Notice: Subject to any disclaimer, the term of this patent is extended or adjusted under 35 U.S.C. 154(b) by 33 days.

(21) Appl. No.: 16/071,717

(22) PCT Filed: Jan. 11, 2017

(86) PCT No.: PCT/CN2017/070880
§ 371 (c)(1),
(2) Date: Jul. 20, 2018

(87) PCT Pub. No.: WO2017/124950
PCT Pub. Date: Jul. 27, 2017

(65) Prior Publication Data
US 2019/0052437 A1   Feb. 14, 2019

(30) Foreign Application Priority Data
Jan. 20, 2016 (CN) .......................... 2016 1 0041342

(51) Int. Cl.
*H04L 5/00* (2006.01)
*H04L 27/26* (2006.01)
(Continued)

(52) U.S. Cl.
CPC .......... *H04L 5/0055* (2013.01); *H04L 1/1671* (2013.01); *H04L 1/1861* (2013.01);
(Continued)

(58) Field of Classification Search
CPC ..................................................... H04L 5/0055
See application file for complete search history.

(56) References Cited

U.S. PATENT DOCUMENTS

| 8,228,782 B2 | 7/2012 | Han et al. |
| 8,542,572 B2 | 9/2013 | Zhang et al. |

(Continued)

FOREIGN PATENT DOCUMENTS

| CN | 101272179 A | 9/2008 |
| CN | 101296021 A | 10/2008 |
| CN | 101350702 A | 1/2009 |
| CN | 102938692 A | 2/2013 |
| WO | 2009022293 A2 | 2/2009 |

OTHER PUBLICATIONS

International Search Report dated Apr. 17, 2017 for International Application No. PCT/CN2017/070880, 7 pages.
(Continued)

*Primary Examiner* — Kevin M Cunningham
(74) *Attorney, Agent, or Firm* — Knobbe, Martens, Olson & Bear, LLP

(57) ABSTRACT

The present disclosure provides a method and an apparatus for transmitting an uplink control signal. The method includes: transmitting M predefined sequences on two transmission symbols within a transmission time interval, and determining an acknowledgement (ACK) message or a negative acknowledgement (NACK) message according to the M predefined sequences and mapping patterns of the M predefined sequences in a time domain and a frequency domain, where M is a positive integer. By means of the above technical solution, a problem that a transmission structure for transmitting the ACK message and the NACK
(Continued)

Transmit M predefined sequences on two transmission symbols within a transmission time interval — S102

Determine an acknowledgement (ACK) message or a negative acknowledgement (NACK) message according to the M predefined sequences and mapping patterns of the M predefined sequences in a time domain and a frequency domain, wherein M is a positive integer — S104 message is imperfect when the transmission time interval is equal to the length of two symbols is solved, and the transmitting of the ACK message and the NACK message when the transmission time interval is equal to the length of two symbols is perfected.

19 Claims, 7 Drawing Sheets

(51) Int. Cl.
*H04L 1/18* (2006.01)
*H04L 1/16* (2006.01)
*H04W 72/04* (2009.01)
*H04W 72/12* (2009.01)
*H04W 24/02* (2009.01)

(52) U.S. Cl.
CPC ...... *H04L 27/2602* (2013.01); *H04L 27/2605* (2013.01); *H04W 72/0413* (2013.01); *H04W 72/1231* (2013.01); *H04W 24/02* (2013.01)

(56) References Cited

U.S. PATENT DOCUMENTS

| | | |
|---|---|---|
| 8,929,194 B2 | 1/2015 | Han et al. |
| 9,538,508 B2 | 1/2017 | Han et al. |
| 2010/0034165 A1 | 2/2010 | Han et al. |
| 2010/0177741 A1 | 7/2010 | Zhang et al. |
| 2010/0238870 A1 | 9/2010 | Mitra et al. |
| 2012/0163330 A1 | 6/2012 | Mitra et al. |
| 2012/0176988 A1 | 7/2012 | Mitra et al. |
| 2013/0003675 A1 | 1/2013 | Han et al. |
| 2015/0092742 A1 | 4/2015 | Han et al. |
| 2018/0098337 A1* | 4/2018 | Lee ............... H04W 72/042 |
| 2019/0007175 A1* | 1/2019 | Kwak ............... H04L 5/00 |

OTHER PUBLICATIONS

Written Opinion of the International Searching Authority dated Apr. 17, 2017 for International Application No. PCT/CN2017/070880, 3 pages.

* cited by examiner

When an ACK is transmitted: | $ZC_1(n)$ | $ZC_2(n)$ |
When a NACK is transmitted: | $ZC_2(n)$ | $ZC_1(n)$ |
Symbol 1  Symbol 2

FIG. 3

When an ACK is transmitted: | $ZC_1(n-k_1(i))$ | $ZC_2(n-k_2(i))$ |
When a NACK is transmitted: | $ZC_2(n-k_2(i))$ | $ZC_1(n-k_1(i))$ |
Symbol 1  Symbol 2

FIG. 4

User 0
When an ACK is transmitted: | $ZC_1(n-0)$ | $ZC_2(n-2)$ |
When a NACK is transmitted: | $ZC_2(n-2)$ | $ZC_1(n-0)$ |
Symbol 1  Symbol 2

User 1
When an ACK is transmitted: | $ZC_1(n-2)$ | $ZC_2(n-0)$ |
When a NACK is transmitted: | $ZC_2(n-0)$ | $ZC_1(n-2)$ |
Symbol 1  Symbol 2

FIG. 5

METHOD AND APPARATUS FOR TRANSMITTING UPLINK CONTROL SIGNAL

CROSS REFERENCE TO RELATED APPLICATIONS

This application is the U.S. National Phase Application under 35 U.S.C. § 371 of International Application No. PCT/CN2017/070880, filed Jan. 11, 2017, designating the U.S. which claims priority to Chinese Application No. 201610041342.7, filed on Jan. 20, 2016, the entire disclosure of each of which is hereby incorporated by reference.

TECHNICAL FIELD

The present disclosure relates to the field of communications, and particularly to a method and an apparatus for transmitting an uplink control signal.

BACKGROUND

In 3rd Generation Partnership Project (3GPP) Long Term Evolution (LTE) and LTE-Advanced (LTE-A) systems, a Transmission Time Interval (TTI) is a basic unit of downlink and uplink transmission scheduling in the time domain. For example, in LTE/LTE-A Frequency Division Duplex (FDD) systems, the downlink and uplink transmission scheduling is divided into radio frames with a length of 10 ms in a time dimension. Each radio frame includes 10 subframes, and a length of the TTI is equal to a length of each subframe, which is equal to 1 ms. Each subframe includes two time slots, each of which has a length of 0.5 ms. Each downlink time slot contains 7 Orthogonal Frequency Division Multiplexing (OFDM) symbols (6 OFDM symbols under extended cyclic prefixes); and each uplink time slot contains 7 Single Carrier-Frequency Division Multiplexing Access (SC-FDMA) symbols (6 SC-FDMA symbols under extended cyclic prefixes).

The subsequent evolution of 3GPP, for example, the 5th generation (5G) mobile communication system, will support higher rate (Gbps), massive link (1 M/Km2), ultralow latency (1 ms), higher reliability, hundredfold increase in energy efficiency, and the like than the LTE/LTE-A systems to support new changes in demands. The ultralow latency is a key indicator of the 5G technology, which directly affects the development of latency-limited services such as car networking, industrial automation, remote control, and smart power grids.

However, an existing TTI with a length of 1 ms will not meet the demand. An effective solution is to reduce the length of the TTI. For example, if the length of the TTI is reduced from the existing length of 1 ms to 0.5 ms or even to one or two OFDM symbols, the minimum scheduling time can be reduced significantly, and further the single transmission latency is reduced by significantly. When the length of the TTI is greater than or equal to the lengths of the three symbols, it is difficult to achieve a unidirectional air interface ultralow latency indicator of 1 ms. Further, in order to achieve higher transmission efficiency, reducing the length of the TTI to the lengths of 2 OFDM/SC-FDMA symbols is one reasonable solution.

In the related art, when the length of the TTI is two symbols, a transmission structure used to transmit an Acknowledgement (ACK) message and a Negative Acknowledgement (NACK) message in a Physical Uplink Control Channel (PUCCH) will not be directly usable. Meanwhile, the reduction in the number of the symbols within the TTI will cause excessive overhead of reference symbols (RS).

For a problem that when the length of the transmission time interval is two symbols, the transmission structure for transmitting the ACK message and the NACK message is imperfect in the prior art, there is no effective solution at present.

SUMMARY

Embodiments of the present disclosure provide a method and an apparatus for transmitting an uplink control signal, so as to at least solve a problem in the related art that a transmission structure for transmitting an ACK message and a NACK message is imperfect when a transmission time interval includes two symbols.

According to an aspect of the embodiment of the present disclosure, there is provided a method for transmitting an uplink control signal, including:
transmitting M predefined sequences on two transmission symbols within a transmission time interval; and
determining an acknowledgment (ACK) message or a negative acknowledgement (NACK) message according to the M predefined sequences and mapping patterns of the M predefined sequences in a time domain and a frequency domain, where M is a positive integer.

Further, when 1 bit of the ACK/NACK is transmitted, M=2; and
when 2 bits of ACK/NACK are transmitted, M=2 or 4.

Further, when M=2, the two predefined sequences include a first predefined sequence and a second predefined sequence. The mapping patterns in the time domain and the frequency-domain are to map the first predefined sequence and the second predefined sequence to different ones of the two transmission symbols within the transmission time interval to transmit the ACK/NACK.

Alternatively, the mapping patterns in the time domain and the frequency domain are to define two different frequency-domain positions on each of the two transmission symbols, and the first predefined sequence and the second predefined sequence are mapped to the different frequency-domain positions on the two transmission symbols to transmit the ACK/NACK.

Further, the different frequency-domain positions are different non-contiguous subcarriers with intervals in the frequency domain, or the different frequency-domain positions are different consecutive subcarriers in the frequency domain.

Further, transmitting the ACK/NACK by transmitting the two predefined sequences and mapping the two predefined sequences to different transmission symbols includes:
when 1 bit of the ACK/NACK is transmitted, transmitting the first predefined sequence on the first transmission symbol and transmitting the second predefined sequence on the second transmission symbol when the ACK message is transmitted; and transmitting the second predefined sequence on the first transmission symbol and transmitting the first predefined sequence on the second transmission symbol when the NACK message is transmitted; and
when 2 bits of the ACK/NACK are transmitted, mapping one by one to the following transmission manners according to different ACKs or NACKs: transmitting the first predefined sequence on the two transmission symbols within the transmission time interval; transmitting the second predefined sequence on the two transmission symbols; transmitting the first predefined sequence by the first transmission symbol and transmitting the second predefined sequence by the second transmission symbol; as well as transmitting the second predefined sequence by the first transmission symbol and transmitting the first predefined sequence by the second transmission symbol.

Further, when 1 bit of the ACK/NACK is transmitted, the first predefined sequence and the second predefined sequence are the same, or are different.

Further, when 2 bits of the ACK/NACK are transmitted, the first predefined sequence and the second predefined sequence are different.

Further, the first predefined sequences of different users are obtained by performing different time-domain cyclic shifts on a same base sequence; the second predefined sequences of different users are obtained by performing different time-domain cyclic shifts on a same base sequence.

Further, performing cyclic shift on the base sequence in the time domain is equivalent to performing phase rotation on the base sequence in the frequency domain.

Further, the predefined sequences are Zadoff-Chu (ZC) sequences or sequences generated based on quadrature phase shift keying (QPSK).

Further, different cells are distinguished by adopting different base sequence s for the predefined sequences.

Further, when the predefined sequences are the ZC sequences, the base sequences of the first predefined sequence and the second predefined sequence within a cell are $ZC_1(n)$ and $ZC_2(n)$, respectively:

$$ZC_1(n) = \exp\left(\frac{-j\mu_1\pi n(n+1)}{N_{ZC}}\right), ZC_2(n) = \exp\left(\frac{-j\mu_2\pi n(n+1)}{N_{ZC}}\right),$$

$$\text{or, } ZC_1(n) = \exp\left(\frac{-j\mu_1\pi n^2}{N_{ZC}}\right), ZC_2(n) = \exp\left(\frac{-j\mu_2\pi n^2}{N_{ZC}}\right),$$

where $N_{ZC}$ represents a length of the ZC sequence, $\mu_1$ and n are both positive integers, exp( ) represents an exponential function with a natural constant e as a radix.

Further, $\mu_1=1$, $\mu_2=N_{ZC}-1$.

Further, different cells are distinguished by performing different scrambling on the predefined sequences.

Further, indexes of two different users that simultaneously transmit the ACK/NACK are i and j.

Cyclic shift amounts of the first predefined sequence and the second predefined sequence transmitted by the user i with respect to the base sequence are $k_1(i)$ and $k_2(i)$, respectively; and cyclic shift amounts of the first defined sequence and the second predefined sequence transmitted by the user j with respect to the base sequence are $k_1(j)$ and $k_2(j)$, respectively.

Further, when the lengths $N_{ZC}$ of the predefined sequences are 4n, $k_1(i)$ and $k_2(j)$ are both even numbers or both odd numbers, and $k_2(i)$ and $k_1(j)$ are both even numbers or both odd numbers, or, $k_1(i)$, $k_2(i)$, $k_1(j)$ and $k_2(j)$ are both even numbers or both odd numbers, wherein n is an integer greater than or equal to zero.

Further, when the lengths $N_{ZC}$ of the predefined sequences are 4n+2, when the lengths $N_{ZC}$ of the predefined sequences are 4n+2, $k_1(i)$ and $k_1(j)$ are both odd numbers and $k_2(i)$ and $k_2(j)$ are both even numbers, or $k_1(i)$ and $k_1(j)$ are both even numbers and $k_2(i)$ and $k_2(j)$ are both odd numbers, wherein n is an integer greater than or equal to zero.

Further, a length of each of the M predefined sequences is a multiple of 12.

Further, the M predefined sequences are mapped onto consecutive subcarriers in the frequency domain, and the number of the subcarriers occupied by the M predefined sequences is an integer multiple of 12.

Further, when 1 bit of the ACK message or the NACK message is transmitted, transmitting the ACK/NACK by transmitting the two predefined sequences and mapping the two predefined sequences to different frequency-domain positions of the two transmission symbols, comprises one of the following:

transmitting the first predefined sequence always on the first transmission symbol, wherein the first predefined sequence of transmitting the ACK message and the first predefined sequence of transmitting the NACK message are mapped to different frequency-domain positions of the first transmission symbol;

transmitting the second predefined sequence always on the second symbol, wherein the second predefined sequence of transmitting the ACK message and the second predefined sequence of transmitting the NACK message are mapped to different frequency-domain positions of the second transmission symbol;

on the first transmission symbol, transmitting the first predefined sequence when the ACK is transmitted, and transmitting the second predefined sequence when the NACK is transmitted, wherein the first predefined sequence and the second predefined sequence are mapped onto different frequency-domain positions; and on the second transmission symbol, transmitting the second predefined sequence when the ACK is transmitted, and transmitting the first predefined sequence when the NACK is transmitted, wherein the first predefined sequence and the second predefined sequence are mapped onto different frequency-domain positions.

Further, the two frequency-domain positions on each of the two transmission symbols include a first frequency-domain position and a second frequency-domain position. When the ACK message is transmitted, the first predefined sequence is mapped to the first frequency-domain position of the first symbol, and the second predefined sequence is mapped to the second frequency-domain position of the second symbol. When the NACK message is transmitted, the first predefined sequence is mapped to the second frequency-domain position of the first symbol, and the second predefined sequence is mapped to the first frequency-domain position of the second symbol.

Further, when 2 bits of the ACK/NACK message are transmitted, the two frequency-domain positions on each of the two transmission symbols include a first frequency-domain position and a second frequency-domain position, respectively, and six mapping patterns include:

a first mapping pattern: the first predefined sequence is mapped to the first frequency-domain position of the first transmission symbol, and the second predefined sequence is mapped to the first frequency-domain position of the second transmission symbol;

a second mapping pattern: the first predefined sequence is mapped to the first frequency-domain position of the first transmission symbol, and the second predefined sequence is mapped to the second frequency-domain position of the second transmission symbol;

a third mapping pattern: the first predefined sequence is mapped to the second frequency-domain position of the first transmission symbol, and the second predefined sequence is mapped to the first frequency-domain position of the second transmission symbol;

a fourth mapping pattern: the first predefined sequence is mapped to the second frequency-domain position of the first transmission symbol, and the second predefined sequence is mapped to the second frequency-domain position of the second transmission symbol;

a fifth mapping pattern: the second predefined sequence is mapped to the first frequency-domain position of the first transmission symbol, and the first predefined sequence is mapped to the second frequency-domain position of the second transmission symbol; and a sixth mapping pattern: the second predefined sequence is mapped to the second frequency-domain position of the first transmission symbol, and the first predefined sequence is mapped to the first frequency-domain position of the second transmission symbol.

Further, it is defined that transmitting the ACK corresponds to a bit "1", and transmitting the NACK corresponds to a bit "0". Transmitting "0, 0", transmitting "0, 1", transmitting "1, 0" and transmitting "1, 1" are in a one-to-one correspondence with four of the six mapping patterns.

Further, transmitting "0, 0" corresponds to the first mapping pattern;

transmitting "0, 1" corresponds to the fifth mapping pattern;

transmitting "1, 0" corresponds to the sixth mapping pattern; and transmitting "1, 1" corresponds to the fourth mapping pattern.

Further, the different subcarriers in the frequency domain are different non-contiguous subcarriers with intervals in the frequency domain, or the different subcarriers in the frequency domain are consecutive subcarriers in different frequency-domain positions.

Further, the length of each of the M predefined sequences is a multiple of 6.

Further, the predefined sequences are Zadoff-Chu (ZC) sequences or sequences generated based on quadrature phase shift keying (QPSK).

Further, different cells are distinguished by adopting different base sequence s for the predefined sequences.

Further, different cells are distinguished by performing different scrambling on the predefined sequences.

Further, time-domain cyclic shift sequences based on the predefined sequences are equivalent to phase rotation sequences based on the predefined sequences.

Further, when M=4, 2 bits of the ACK/NACK message are transmitted by using the four predefined sequences, and the four predefined sequences include a first predefined sequence, a second predefined sequence, a third predefined sequence and a fourth predefined sequence, respectively. The mapping patterns of the four predefined sequences in the time domain and the frequency domain include: only two of the four predefined sequences are selected for transmitting the ACK/NACK each time, when the selected two are the first predefined sequence and the second predefined sequence, the first predefined sequence and the second predefined sequence are only mapped to the first transmission symbol within the transmission time interval, and when the selected two are the third predefined sequence or the fourth predefined sequence, the third predefined sequence or the fourth predefined sequence are only mapped to the second transmission symbol within the transmission time interval.

Further, the first predefined sequence and the second predefined sequence are obtained by performing different cyclic shifts on a same base sequence, and the third predefined sequence and the fourth predefined sequence are obtained by performing different cyclic shifts on a same base sequence.

Further, the 2 bits for transmitting the ACK/NACK include a first bit and a second bit. When the first bit is the ACK, the first predefined sequence is transmitted on the first transmission symbol. When the first bit is the NACK, the second predefined sequence is transmitted on the first transmission symbol. When the second bit is the ACK, the third predefined sequence is transmitted on the second transmission symbol. When the second bit is the NACK, the fourth predefined sequence is transmitted on the second transmission symbol.

Further, when M=4, the 2 bits of the ACK message/NACK message are transmitted by using the four predefined sequences. The four predefined sequences include a first predefined sequence, a second predefined sequence, a third predefined sequence and a fourth predefined sequence. The mapping patterns of the four predefined sequences in the time domain include: the first predefined sequence is transmitted on both the two transmission symbols; the second predefined sequence is transmitted on both the two transmission symbols; the third predefined sequence is transmitted on both the two transmission symbols; and the fourth predefined sequence is transmitted on both the two transmission symbols Alternatively, the mapping patterns of the four predefined sequences in the time domain include: the first predefined sequence is transmitted on the first transmission symbol, the second predefined sequence is transmitted on the second transmission symbol; the second predefined sequence is transmitted on the first transmission symbol, and the first predefined sequence is transmitted on the second transmission symbol; the third predefined sequence is transmitted on the first transmission symbol, and the fourth predefined sequence is transmitted on the second transmission symbol; and the fourth predefined sequence is transmitted on the first transmission symbol, and the third predefined sequence is transmitted on the second transmission symbol.

Further, a transmitting process in which the ACK/NACK message is carried in the two predefined sequences on the two transmission symbols within the transmission time interval includes one of the following:

performing a discrete Fourier transform (DFT), an inverse fast Fourier transform (IFFT) and a cyclic prefix adding on the two predefined sequences transmitted on the two transmission symbols, respectively; and performing the DFT and the IFFT on the two predefined sequences transmitted on the two transmission symbols, and then performing parallel-serial conversion, and adding cyclic prefixes together.

According to another aspect of the embodiment of the present disclosure, there is further provided an apparatus for transmitting an uplink control signal, including:

a transmission module, which is configured to transmit M predefined sequences on two transmission symbols within a transmission time interval; and a determination module, which is configured to determine an acknowledgement (ACK) message or a negative acknowledgement (NACK) message according to the M predefined sequences and mapping patterns of the M predefined sequences in a time domain and a frequency domain, where M is a positive integer.

According to the embodiments of the present disclosure, M predefined sequences are transmitted on two transmission symbols within a transmission time interval, and an acknowledgement (ACK) message or a negative acknowledgement (NACK) message is determined according to the M predefined sequences and mapping patterns of the M predefined sequences in a time domain and a frequency domain, where M is a positive integer. Accordingly, a problem that a transmission structure for transmitting the ACK message and the NACK messages is imperfect when the transmission time interval is equal to lengths of two symbols is solved, and the transmission of the ACK message and the NACK message with the transmission time interval which is equal to the lengths of the two symbols is perfected.

BRIEF DESCRIPTION OF DRAWINGS

Accompanying drawings illustrated herein are intended to provide a further understanding of the present disclosure, and constitute a part of the present disclosure. Exemplary embodiments of the present disclosure and descriptions thereof are intended to explain the present disclosure, but not intended to limit the present disclosure. In the drawing:

FIG. 3 is a schematic diagram illustrating that a user transmits an ACK/NACK message at two transmission symbols by using predefined sequences according to a preferred embodiment of the present disclosure;

FIG. 4 is a schematic diagram illustrating that multiple users transmit ACK/NACK messages at two transmission symbols by using predefined sequences according to a preferred embodiment of the present disclosure;

FIG. 5 is a schematic diagram of transmission when the transmission time interval is used by two users according to a preferred embodiment of the present disclosure;

DETAILED DESCRIPTION

The present disclosure will be described in detail below with reference to accompanying drawings in conjunction with embodiments. It should be noted that the embodiments in the present application and features in the embodiments may be combined with each other without conflict.

It should be noted that terms "first", "second", and the like in the specification and claims as well as the accompanying drawings of the present disclosure are used to distinguish similar objects, and are not necessarily used to describe a particular sequence or precedence order.

Figure 1:
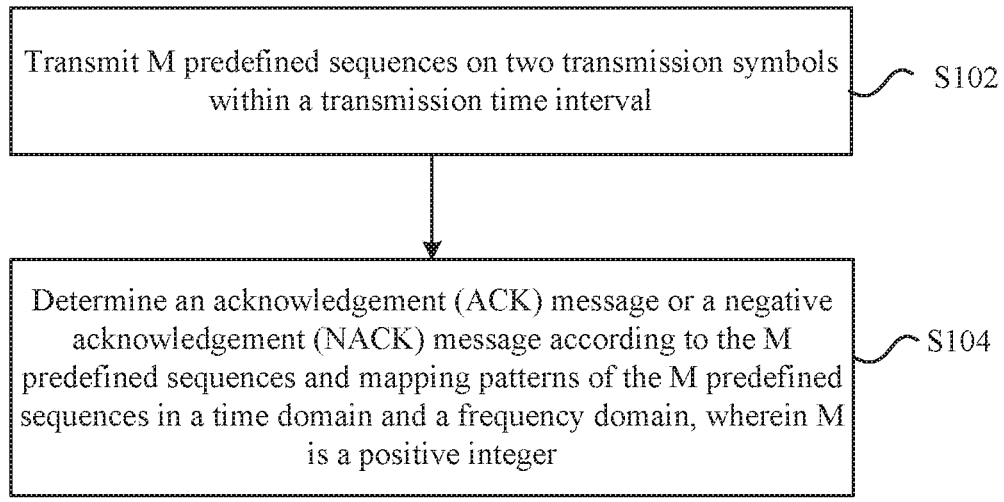
FIG. 1 is a flowchart of a method for transmitting a control signal according to an embodiment of the present disclosure.

In the present embodiment, there is provided a method for transmitting a control signal when a length of a TTI is 2 symbols. FIG. 1 is a flowchart of a method for transmitting a control signal according to an embodiment of the present disclosure. As shown in FIG. 1, the method includes the following steps.

In step S102, M predefined sequences are transmitted on two transmission symbols within a transmission time interval.

In step S104, an acknowledgment (ACK) message and/or a negative acknowledgement (NACK) message is determined according to the M predefined sequences, mapping patterns of the M predefined sequences in a time domain and mapping patterns of the M predefined sequences in a frequency domain, where M is a positive integer.

According to the present disclosure, M predefined sequences are transmitted on two transmission symbols within a transmission time interval, and the ACK/NACK is determined according to the M predefined sequences and mapping patterns of the M predefined sequences in a time domain and a frequency domain, where M is a positive integer. Accordingly, a problem that a transmission structure for transmitting the ACK message/the NACK message is imperfect when the length of the transmission time interval is two symbols is solved, and the transmission of the ACK/NACK message with the transmission time interval being equal to the length of the two symbols is perfected.

In the embodiment of the present disclosure, when 1 bit of the ACK/NACK is transmitted, preferably M=2.

In the embodiment of the present disclosure, when 2 bits of the ACK/NACK are transmitted, preferably M=2 or 4.

When M=2, the two predefined sequences are defined as a first predefined sequence and a second predefined sequence, and time-frequency mapping patterns include: the first predefined sequence and the second predefined sequence are mapped to two different transmission symbols within a transmission time interval to transmit the ACK/NACK, or two different frequency-domain positions are defined on each transmission symbol, and the first predefined sequence and the second predefined sequence are mapped to different frequency-domain positions on two transmission symbols to transmit the ACK/NACK.

In the embodiment of the present disclosure, the different frequency-domain positions are different alternate non-contiguous subcarrier positions in the frequency domain, or the different frequency-domain positions are different consecutive subcarrier positions in the frequency domain.

The method for transmitting the ACK/NACK by transmitting two predefined sequences and mapping the two predefined sequences to different transmission symbols includes.

When 1 bit of the ACK/NACK is transmitted by a user, a transmission rule is as follows: when the user transmits the ACK message, the first transmission symbol transmits the first predefined sequence, and the second transmission symbol transmits the second predefined sequence; and when the user transmits the NACK message, the first transmission symbol transmits the second predefined sequence, and the second transmission symbol transmits the first predefined sequence.

When the user transmits 2 bits of the ACK/NACK, the user maps them one by one to one of the following transmission manners according to different ACKs or NACKs: the first predefined sequence is transmitted on the two transmission symbols within the transmission time interval; or the second predefined sequence is transmitted on the two transmission symbols; or the first transmission symbol transmits the first predefined sequence, the second transmission symbol transmits the second predefined sequence; or the first transmission symbol transmits the second predefined sequence, and the second transmission symbol transmits the first predefined sequence.

In the embodiment of the present disclosure, the first predefined sequences of different users are obtained by performing different time-domain cyclic shifts on a same base sequence; and the second predefined sequences of different users are obtained by performing different time-domain cyclic shifts on a same base sequence as well.

It should be noted that the cyclic shift of the base sequence in the time domain is equivalent to phase rotation of the base sequence in the frequency domain.

In the embodiment of the present disclosure, the predefined sequences preferably adopt Zadoff-Chu (ZC) sequences or sequences generated based on quadrature phase shift keying (QPSK).

In the embodiment of the present disclosure, different cells are distinguished by adopting different base sequences for the predefined sequences.

In the embodiment of the present disclosure, when the predefined sequences are the ZC sequences, base sequences defining the first predefined sequence and the second predefined sequence within a cell are $ZC_1(n)$ and $ZC_2(n)$, respectively:

$$ZC_1(n) = \exp\left(\frac{-j\mu_1\pi n(n+1)}{N_{ZC}}\right), ZC_2(n) = \exp\left(\frac{-j\mu_2\pi n(n+1)}{N_{ZC}}\right)$$

$N_{ZC}$ represents a length of the ZC sequence. Preferably, $\mu_1=1, \mu_2=N_{ZC}-1$. Further, different cells are distinguished by performing different kinds of scrambling on different predefined sequences.

In the embodiment of the present disclosure, it is assumed that indexes of any two different users that simultaneously transmit the ACK/NACK are i and j. Cyclic shift amounts of the first predefined sequence and the second predefined sequence transmitted by the user i with respect to the base sequence are $k_1(i)$ and $k_2(i)$, respectively; and cyclic shift amounts of the first defined sequence and the second predefined sequence transmitted by the user j with respect to the base sequence are $k_1(j)$ and $k_2(j)$, respectively.

When the lengths $N_{ZC}$ of the predefined sequences are 4n, where n is an integer greater than or equal to 0, preferably, $k_1(i)$ and $k_2(j)$ are both even numbers or both odd numbers, and $k_2(i)$ and $k_1(j)$ are both even numbers or both odd numbers. Further, preferably, $k_1(i)$, $k_2(i)$, $k_1(j)$ and $k_2(j)$ should all be even numbers or all be odd numbers.

In the embodiment of the present disclosure, when the lengths $N_{ZC}$ of the predefined sequences are 4n+2, where n is an integer greater than or equal to zero, preferably, $k_1(i)$ and $k_1(j)$ are both odd numbers and $k_2(i)$ and $k_2(j)$ are both even numbers, or $k_1(i)$ and $k_1(j)$ are both even numbers and $k_2(i)$ and $k_2(j)$ are both odd numbers.

In the embodiment of the present disclosure, preferably, the lengths of the predefined sequences are multiples of 12, preferably, the lengths of the sequences are 12 and 24.

In the embodiment of the present disclosure, preferably, the predefined sequences are mapped onto consecutive subcarriers in the frequency domain, and the number of the subcarriers occupied by the predefined sequences is an integer multiple of 12, preferably, the number of the subcarriers occupied by the predefined sequences is 12 or 24.

The method for transmitting the ACK/NACK by transmitting two predefined sequences and mapping the two predefined sequences to different frequency domain symbol positions is characterized as follows.

When the user transmits 1 bit of ACK/NACK message, the first predefined sequence is always transmitted on the first transmission symbol, but the frequency-domain position of the first transmission symbol where the first predefined sequence is mapped to when the user transmits the ACK message is different from the frequency-domain position of the first transmission symbol where the first predefined sequence is mapped to when the user transmits the NACK message. The second predefined sequence is always transmitted on the second transmission symbol, but the second predefined sequence is mapped to a different frequency-domain position of the second transmission symbol when the user transmits the ACK message from that when the user transmits the NACK message. Alternatively, in the position of the first transmission symbol, the first predefined sequence is transmitted when the ACK is transmitted, and the second predefined sequence is transmitted when the NACK is transmitted, but the first predefined sequence and the second predefined sequence are mapped onto different frequency-domain positions. In the position of the second transmission symbol, the second predefined sequence is transmitted when the ACK is transmitted, and the first predefined sequence is transmitted when the NACK is transmitted, but the first predefined sequence and the second predefined sequence are mapped onto different frequency-domain positions.

In the embodiment of the present disclosure, the two frequency-domain positions on each transmission symbol are defined as the first frequency-domain position and the second frequency-domain position. Preferably when the ACK message is transmitted, the first predefined sequence is mapped to the first frequency-domain position of the first transmission symbol, and the second predefined sequence is mapped to the second frequency-domain position of the second transmission symbol; and when the NACK message is transmitted, the first predefined sequence is mapped to the second frequency-domain position of the first transmission symbol, and the second predefined sequence is mapped to the first frequency-domain position of the second transmission symbol.

When 2 bits of the ACK/NACK message are transmitted, further, two frequency-domain positions on each transmission symbol are defined as the first frequency-domain position and the second frequency-domain position, respectively. Further, four mapping patterns are defined as follows. A first mapping pattern: the first predefined sequence is mapped to the first frequency-domain position of the first transmission symbol, and the second predefined sequence is mapped to the first frequency-domain position of the second transmission symbol. A second mapping pattern: the first predefined sequence is mapped to the first frequency-domain position of the first transmission symbol, and the second predefined sequence is mapped to the second frequency-domain position of the second transmission symbol. A third mapping pattern: the first predefined sequence is mapped to the second frequency-domain position of the first transmission symbol, and the second predefined sequence is mapped to the second frequency-domain position of the first transmission symbol A fourth mapping pattern: the first predefined sequence is mapped to the second frequency-domain position of the first transmission symbol, and the second predefined sequence is mapped to the second frequency-domain position of the second transmission symbol.

In the embodiment of the present disclosure, it is defined that transmitting the ACK corresponds to a bit "1", and transmitting the NACK corresponds to a bit "0". Transmitting "0, 0", transmitting "0, 1", transmitting "1, 0" and transmitting "1, 1" have a one-to-one correspondence relationship with the above four mapping patterns.

Preferably, when "0, 0" is transmitted, it corresponds to the first mapping pattern;

when "0, 1" is transmitted, it corresponds to the second mapping pattern; when "1, 0" is transmitted, it corresponds to the third mapping pattern; and when "1, 1" is transmitted, it corresponds to the fourth mapping pattern.

In the embodiment of the present disclosure, the different subcarrier positions in the frequency domain are different alternate non-contiguous subcarrier positions in the frequency domain, or the different subcarrier positions in the t frequency domain are consecutive subcarrier positions in different frequency-domain positions.

In the embodiment of the present disclosure, the lengths of the predefined sequences are multiples of 6. Preferably, the predefined sequences employ ZC (Zadolff-Chu) sequences or sequences generated based on QPSK. Preferably, the lengths of the sequences are 6 and 12.

In the embodiment of the present disclosure, users within different cells are distinguished by performing cyclic shifts on different base sequences.

In the embodiment of the present disclosure, for different users, different time-domain cyclic shifts are performed for the same predefined sequence.

In the embodiment of the present disclosure, the above time-domain cyclic shift sequences based on the predefined sequences are equivalent to phase rotation sequences based on the predefined sequences.

When M=4, 2 bits of the ACK/NACK message are transmitted by using the four predefined sequences, and the four predefined sequences are defined as a first predefined sequence, a second predefined sequence, a third predefined sequence and a fourth predefined sequence, respectively. Time-frequency mapping patterns include: only two of the four predefined sequences are selected each time for transmitting the ACK/NACK, the selected two predefined sequences are only mapped to time-domain positions of the first transmission symbol within the transmission time interval when the first predefined sequence or the second predefined sequence is transmitted, and the selected two predefined sequences are only mapped to time-domain positions of the second symbol within the transmission time interval when the third predefined sequence or the fourth predefined sequence is transmitted.

In the embodiment of the present disclosure, the first predefined sequence and the second predefined sequence are obtained by performing different cyclic shifts on a same base sequence, and the third predefined sequence and the fourth predefined sequence are obtained by performing different cyclic shifts on a same base sequence.

In the embodiment of the present disclosure, the two bits of transmitting the ACK/NACK are defined as a first bit and a second bit, respectively. When the first bit is the ACK, the first predefined sequence is transmitted on the first transmission symbol. When the first bit is the NACK, the second predefined sequence is transmitted on the first transmission symbol. When the second bit is the ACK, the third predefined sequence is transmitted on the second transmission symbol. When the second bit is the NACK, the fourth predefined sequence is transmitted on the second transmission symbol.

In the embodiment of the present disclosure, the process of transmitting the ACK/NACK message which is carried in the two predefined sequences on two transmission symbols within the transmission time interval includes: performing a discrete Fourier transform (DFT), an inverse fast Fourier transform (IFFT) and a cyclic prefix adding process on the predefined sequences on the two transmission symbols, respectively. Alternatively, the transmitting process includes performing the DFT and the IFFT on the predefined sequences on the two transmission symbols, and then performing parallel-serial conversion on the predefined sequences on the two transmission symbols, and finally adding the cyclic prefixes simultaneously on the predefined sequences on the two transmission symbols.

In the present embodiment, there is further provided an apparatus for transmitting an uplink control signal. The apparatus is used to implement the above embodiment and preferred implementations, which have already described and therefore will be omitted here. Herein, the term "module" refers to a combination of software and/or hardware capable of implementing a predetermined function. Although the apparatus described in the following embodiments is preferably implemented in software, implementing in hardware, or implementing in hardware a combination of software and hardware is also possible and conceivable.

Figure 2:
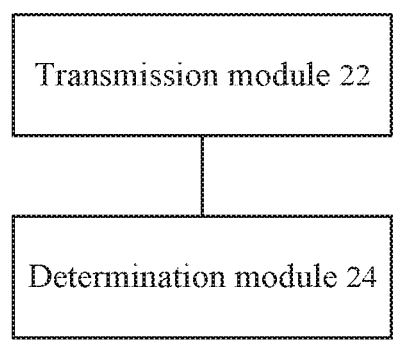
FIG. 2 is a block diagram showing a structure of an apparatus for transmitting an uplink control signal according to an embodiment of the present disclosure.

FIG. 2 is a block diagram showing a structure of an apparatus for transmitting an uplink control signal according to an embodiment of the present disclosure. As shown in FIG. 2, the apparatus includes a transmission module 22 and a determination module 24.

The transmission module 22 is configured to transmit M predefined sequences on two transmission symbols within a transmission time interval.

The determination module 24 is configured to determine an acknowledgement (ACK) message or a negative acknowledgement (NACK) message according to the M predefined sequences and mapping patterns of the M predefined sequences in a time domain and a frequency domain, where M is a positive integer.

According to the apparatus, the transmission module 22 is configured to transmit M predefined sequences on two transmission symbols within a transmission time interval, and the determination module 24 is configured to determine an acknowledgement (ACK) message or a negative acknowledgement (NACK) message according to the M predefined sequences and mapping patterns of the M predefined sequences in a time domain and a frequency domain, where M is a positive integer. Accordingly, a problem that a transmission structure for transmitting the ACK message and the NACK message is imperfect when the transmission time interval is equal to lengths of two symbols is solved, and the transmission of the ACK message and the NACK message with the transmission time interval the length of which is equal to two symbols is perfected.

The present disclosure will now be described in detail in conjunction with preferred embodiments and implementations.

A First Preferred Embodiment

FIG. 3 is a schematic diagram illustrating that a user transmits an ACK/NACK message at two symbol positions by using predefined sequences according to a preferred embodiment of the present disclosure. As shown in FIG. 3, it is assumed that the predefined sequences are $ZC_1(n)$ and $ZC_2(n)$, respectively, and time-domain cyclic shifts assigned for the user are both 0. The lengths of the sequences are 12, and the predefined sequences are mapped onto 12 consecutive subcarriers in the frequency domain. The $ZC_1(n)$ and the $ZC_2(n)$ are respectively generated by the following formula.

$$ZC_1(n) = \exp\left(\frac{-j\mu_1\pi n(n+1)}{N_{ZC}}\right), ZC_2(n) = \exp\left(\frac{-j\mu_2\pi n(n+1)}{N_{ZC}}\right) \quad (1)$$

As shown in FIG. 3, when the ACK message is transmitted, the user transmits the predefined sequence $ZC_1(n)$ at a transmission symbol 1, and transmits the predefined sequence $ZC_2(n)$ at a transmission symbol 2; and when the NACK message is transmitted, the user transmits the predefined sequence $ZC_2(n)$ at the transmission symbol 1, and transmits the predefined sequence $ZC_1(n)$ at the transmission symbol 2.

Correspondingly, a receiving end performs peak correlation at the transmission symbols 1 and 2 by using the $ZC_1(n)$ and the $ZC_2(n)$, respectively. For example, a peak appears at the transmission symbol 1 and there is no peak at the transmission symbol 2 when the correlation is performed by using the $ZC_1(n)$; and there is no peak at the transmission symbol 1 and a peak appears at the transmission symbol 2 when the correlation is performed by using the $ZC_2(n)$, it indicates that the ACK message is transmitted.

Further, a base station may accurately estimate a timing error and a frequency deviation by using the two sequences. For example, the following formula may be employed:

$$\Delta = \frac{N_{ZC} \times f_d}{f_s} \quad (2)$$

where Δ represents the number of samples with peak deviations after the ZC sequences are correlated with received sequences. $f_s$ represents a sampling frequency, $f_d$ represents a frequency deviation, and $N_{ZC}$ represents lengths of the ZC sequences. If the deviation of the $ZC_1(n)$ with respect to the corresponding received sequence is Δ, a peak deviation of the $ZC_2(n)$ with respect to the corresponding received sequence on the other symbol is −Δ. Accordingly, the receiving end may estimate the timing error and the frequency deviation by using peak deviations on different symbols.

A Second Preferred Embodiment

FIG. 4 is a schematic diagram illustrating that multiple users transmit ACK/NACK messages at two symbol positions by using predefined sequences according to a preferred embodiment of the present disclosure. The lengths of the predefined sequences are $N_{ZC}$=12, and the predefined sequences are mapped onto consecutive frequency-domain subcarriers. It is assumed that indexes of the multiple users are i=0, 1, . . . , $$\frac{N_{ZC}}{2} - 1.$$

It is assumed that the predefined sequences are $ZC_1(n)$ and $ZC_2(n)$, respectively, and a user i uses cyclic shift sequences based on two predefined sequences, time-domain cyclic shift amounts of which are $k_1(i)$ and $k_2(i)$, respectively, where their ranges both are 0, 1, 2 . . . , $N_{ZC}$−1. Or phase rotations based on the two predefined sequences are each $e^{j\alpha_1 n}$, where $$\alpha = \frac{2\pi k_i(i)}{N_{ZC}}.$$

As shown in FIG. 4, the user i transmits a sequence $ZC_1(n-k_1(i))$ at the symbol 1 and transmits a sequence $ZC_2(n-k_2(i))$ at the symbol 2 when the ACK message is transmitted; and the user i transmits the sequence $ZC_2(n-k_2(i))$ at the symbol 1 and transmits the sequence $ZC_1(n-k_1(i))$ at the symbol 2 when the NACK message is transmitted.

Further, in order to ensure good orthogonality between cyclic shift sequences generated based on the $ZC_1(n)$ and the $ZC_2(n)$. for any two users i and j, $k_1(i)$, $k_2(j)$, $k_2(i)$ and $k_2(j)$ should all be even numbers or all be odd numbers.

FIG. 5 is a schematic diagram of transmission when two users are multiplexed according to a preferred embodiment of the present disclosure. Cyclic shifts of a user 0 based on base sequences $ZC_1(n)$ and $ZC_2(n)$ in FIG. 5 are $k_1(0)$=0 and $k_2(0)$=2, respectively. Cyclic shifts of a user 1 based on the base sequences $ZC_1(n)$ and $ZC_2(n)$ are $k_1(1)$=2 and $k_2(1)$=0, respectively. In this case, $k_1(0)$, $k_2(1)$, $k_2(0)$ and $k_1(1)$ are all even numbers. Accordingly, the $ZC_1(n)$, the $ZC_2(n)$, $ZC_1(n-2)$ and $ZC_2(n-2)$ are theoretically completely orthogonal, which may reduce the interference between different users and reduce the misjudgment between the ACK and the NACK.

A Third Preferred Embodiment

Figure 6:
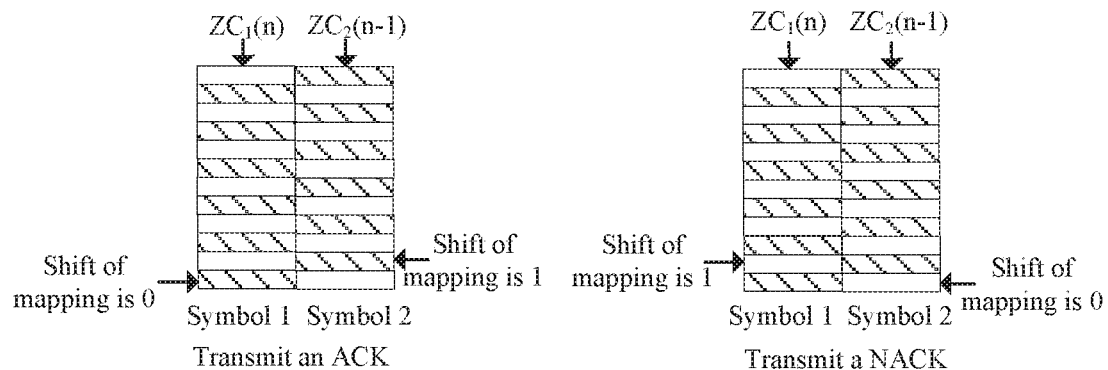
FIG. 6 is a first schematic diagram illustrating that one user transmits an ACK/NACK message at two transmission symbols by using predefined sequences according to a preferred embodiment of the present disclosure.

FIG. 6 is a first schematic diagram illustrating that one user transmits an ACK/NACK message at two symbol positions by using predefined sequences according to a preferred embodiment of the present disclosure, where the frequency domain mapping is a comb structure. The lengths of the predefined sequences are $N_{ZC}$=6, and the predefined sequences are mapped onto alternate frequency-domain subcarriers. It is assumed that the predefined sequences are $ZC_1(n)$ and $ZC_2(n)$, respectively. The user uses cyclic shift sequences which are based on the two predefined sequences, and time-domain cyclic shift amounts thereof are 0 and 1, respectively, that is, $ZC_1(n)$ and $ZC_2(n-1)$, respectively.

In FIG. 6, when the ACK is transmitted and when the NACK is transmitted, the predefined sequence $ZC_1(n)$ is always transmitted on a first symbol, and the predefined sequence $ZC_2(n-1)$ is always transmitted on a second symbol. When the ACK is transmitted, a shift of a subcarrier, where the $ZC_1(n)$ is mapped to in the frequency domain, on the first symbol is 0, and a shift of a subcarrier, where the $ZC_2(n-1)$ is mapped to in the frequency domain, on the second symbol is 1. When the NACK is transmitted, a shift of the subcarrier, where the $ZC_1(n)$ is mapped to in the frequency domain, on the first symbol is 1, and a shift of the subcarrier, where the $ZC_2(n-1)$ is mapped to in the frequency domain, on the second symbol is 0. In addition, the difference in frequency domain shifts of the sequences transmitted on the two symbols may reduce the inter-symbol interference.

Figure 7:
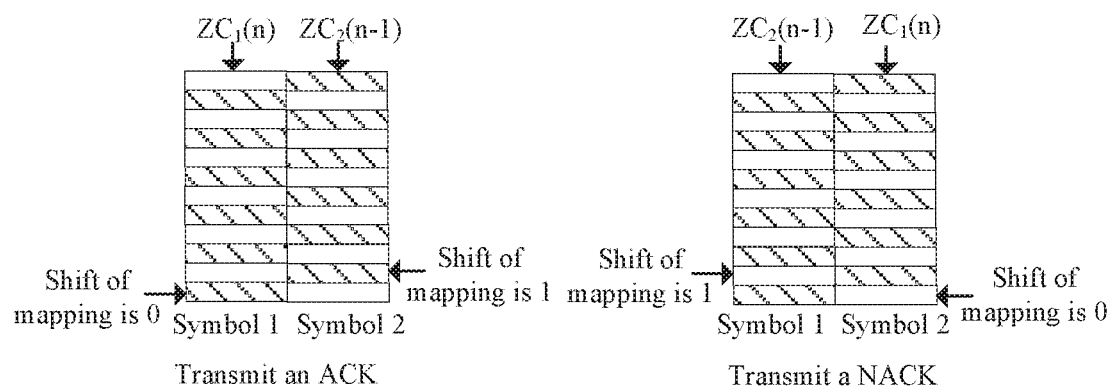
FIG. 7 is a second schematic diagram of illustrating that one user transmits an ACK/NACK message at two transmission symbols by using predefined sequences according to a preferred embodiment of the present disclosure.

FIG. 7 is a second schematic diagram illustrating that a user transmits an ACK/NACK message at two symbol positions by using predefined sequences according to a preferred embodiment of the present disclosure. As shown in FIG. 7, in positions of a first symbol, when an ACK is transmitted, the $ZC_1(n)$ is transmitted and a shift of the subcarrier where the $ZC_1(n)$ is mapped to in the frequency domain is 0. When a NACK is transmitted, the $ZC_2(n-1)$ is transmitted and a shift of the subcarrier where the $ZC_2(n-1)$ is mapped to in the frequency domain is 1. In positions of a second symbol, when the ACK is transmitted, the $ZC_2(n-1)$ is transmitted and a shift of the subcarrier where the $ZC_2(n-1)$ is mapped to in the frequency domain is 1, and when the NACK is transmitted, the $ZC_1(n)$ is transmitted and a shift of the subcarrier where the $ZC_1(n)$ is mapped to in the frequency domain is 0.

Examples given in FIG. 6 and FIG. 7 both may guarantee better orthogonality when different users transmits the ACK and the NACK on the same frequency-domain subcarrier.

A Fourth Preferred Embodiment

Figure 8:
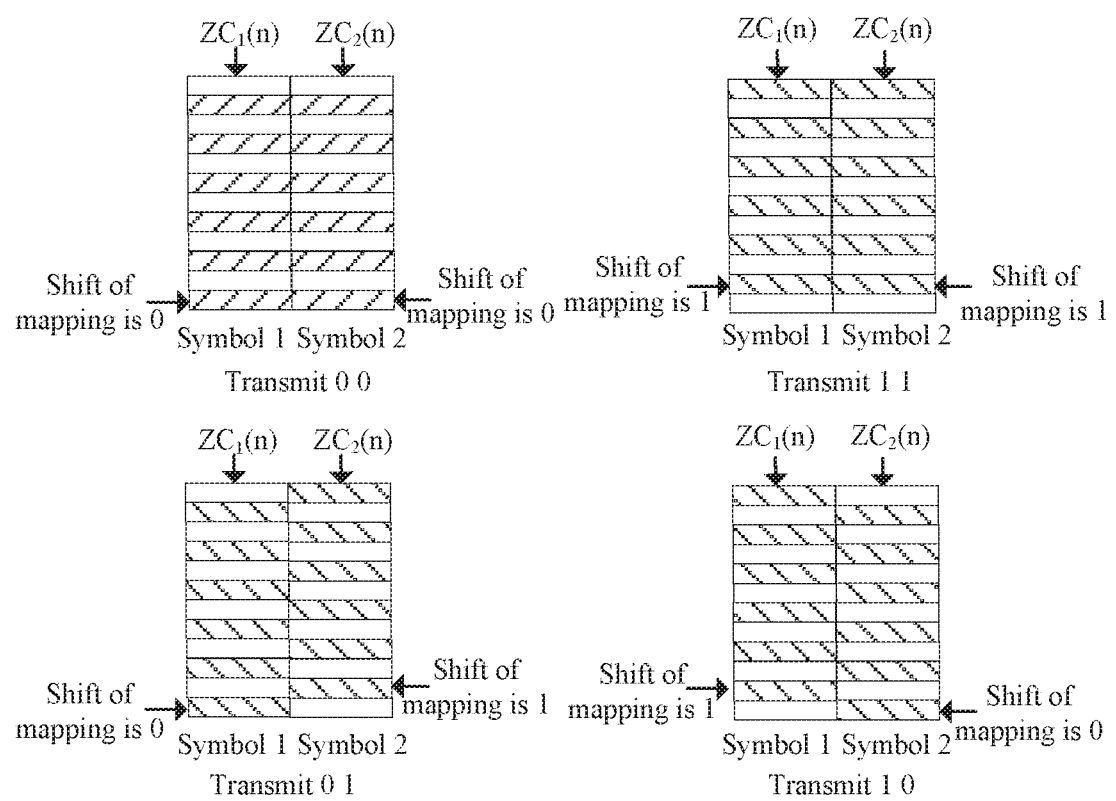
FIG. 8 is a schematic diagram illustrating that one user transmits 2 bits of ACK/NACK message at two transmission symbols by using predefined sequences according to a preferred embodiment of the present disclosure.

FIG. 8 is a schematic diagram illustrating a user transmits 2 bits of ACK/NACK message at two symbol positions by using predefined sequences according to a preferred embodiment of the present disclosure, where a frequency domain is mapped to a comb structure. The lengths of the predefined sequences are $N_{ZC}=6$, and the predefined sequences are mapped to alternate frequency-domain subcarriers. It is assumed that base sequences of the predefined sequences are $ZC_1(n)$ and $ZC_2(n)$, respectively, and the user uses cyclic shift sequences that are based on two predefined sequences, time-domain cyclic shift amounts of which are 0 and 0, respectively, that is, $ZC_1(n)$ and $ZC_2(n)$, respectively.

It is defined that transmitting an ACK corresponds to "1", and transmitting a NACK corresponds to "0". In FIG. 8, the $ZC_1(n)$ is always transmitted on a first symbol, and the $ZC_2(n)$ is always transmitted on a second symbol. A first bit of ACK/NACK message corresponds to a frequency-domain shift of the first symbol, and a second bit of ACK/NACK message corresponds to a frequency-domain shift of the second symbol. When "0" is transmitted, a corresponding shift in a frequency domain is 0, and when "1" is transmitted, a corresponding shift in the frequency domain is 1. As shown in FIG. 8, when two bits of NACK message are transmitted, that is, 00 is transmitted, the predefined sequences on the first symbol and the second symbol are mapped onto the subcarriers whose frequency-domain shifts are both 0.

When a 1 bit of ACK message and a 1 bit of NACK message are transmitted, frequency-domain subcarrier shifts of the sequences on the two symbols are different, which may reduce the inter-symbol interference between the ACK and the NACK.

A Fifth Preferred Embodiment

Figure 9:
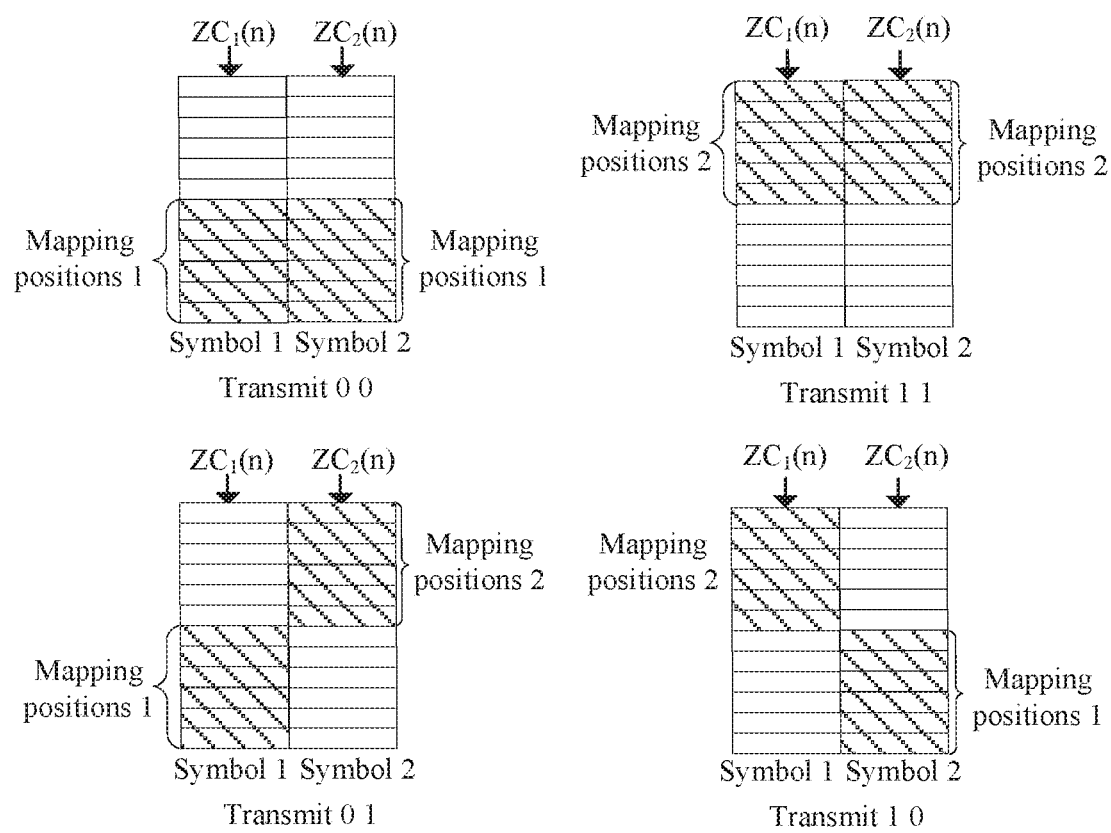
FIG. 9 is a schematic diagram illustrating that a user transmits an ACK/NACK message at two transmission symbols by using predefined sequences according to a preferred embodiment of the present disclosure.

FIG. 9 is a schematic diagram illustrating that a user transmits an ACK/NACK message at two symbol positions by using predefined sequences according to a preferred embodiment of the present disclosure, where a frequency domain is mapped to contiguous subcarriers. The lengths of the predefined sequences are $N_{ZC}=6$, and the predefined sequences are mapped onto consecutive frequency-domain subcarriers. It is assumed that base sequences of the predefined sequences are $ZC_1(n)$ and $ZC_2(n)$, respectively, and the user uses cyclic shift sequences based on two base sequences, time-domain cyclic shift amounts of which are 0 and 0, respectively, that is, $ZC_1(n)$ and $ZC_2(n)$, respectively. Two consecutive frequency-domain positions are defined in FIG. 9, and occupy six consecutive subcarriers, respectively.

Further, it is defined that transmitting an ACK corresponds to "1", and transmitting a NACK corresponds to "0". In FIG. 9, the $ZC_1(n)$ is always transmitted on a first symbol, and the $ZC_2(n)$ is always transmitted on a second symbol. A first bit of ACK/NACK message corresponds to a frequency-domain position of the first symbol, and a second bit of ACK/NACK message corresponds to a frequency-domain position of the second symbol. When "0" is transmitted, the corresponding frequency-domain position is 1, and when "1" is transmitted, the corresponding frequency-domain position is 2. As shown in FIG. 9, when two bits of NACK message are transmitted, that is, when "01" is transmitted, the predefined sequences on the first symbol are mapped onto 6 subcarriers in the frequency-domain position 1, and the predefined sequences on the second symbol are mapped onto 6 subcarriers in the frequency-domain position 2.

When a 1 bit of ACK message and a 1 bit of NACK message are transmitted, frequency-domain positions of the sequences on the two symbols are different, which may reduce the inter-symbol interference between the ACK and the NACK.

A Sixth Preferred Embodiment

Figure 10:
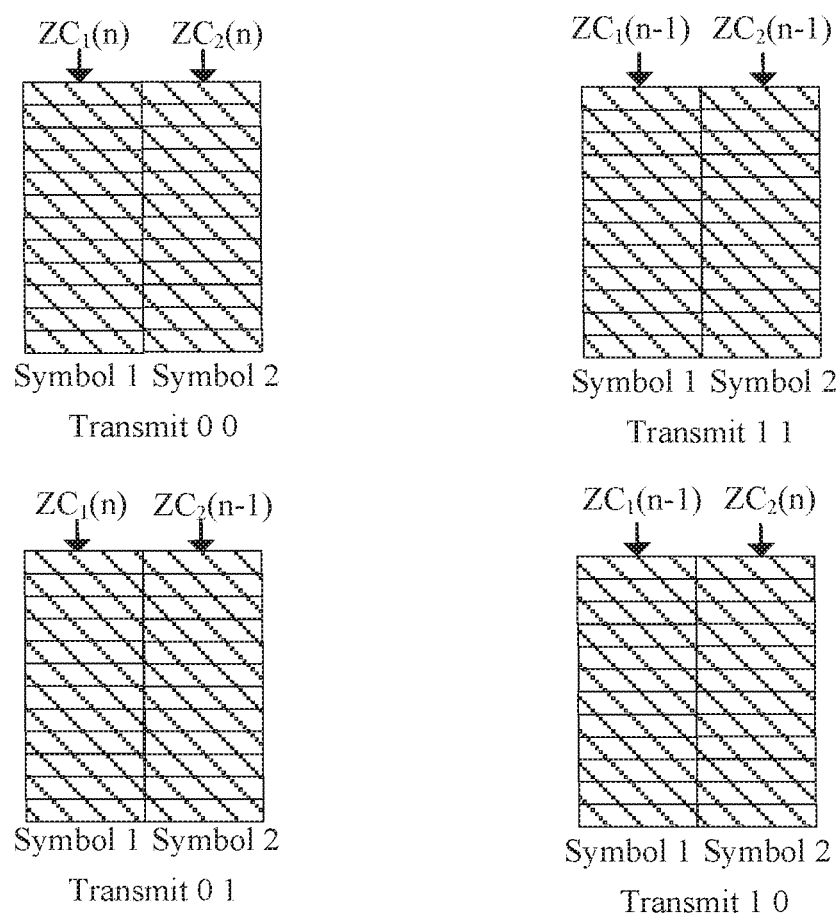
FIG. 10 is a schematic diagram illustrating that a user transmits 2 bits of ACK/NACK message at two transmission symbols by using four predefined sequences according to a preferred embodiment of the present disclosure.

FIG. 10 is a schematic diagram illustrating that a user transmits 2 bits of ACK/NACK message at two symbol positions by using four predefined sequences according to a preferred embodiment of the present disclosure. The lengths of the predefined sequences are $N_{ZC}=12$, and the predefined sequences are mapped onto consecutive frequency-domain subcarriers. It is assumed that base sequences of first and second predefined sequences are $ZC_1(n)$ and $ZC_2(n)$, respectively. The first and second predefined sequences are obtained by performing cyclic shifts on the $ZC_1(n)$, for example, cyclic shift amounts are taken as 0 and 1, respectively; and third and fourth predefined sequences are obtained by performing cyclic shifts on the $ZC_2(n)$, for example, cyclic shift amounts are taken as 0 and 1, respectively.

As shown in FIG. 10, further, it is defined that transmitting an ACK corresponds to "1", and transmitting a NACK corresponds to "0". In FIG. 10, when a first bit of the two bits of ACK/NACK is transmitted, the $ZC_1(n)$ is transmitted on a first symbol; when the first bit is the ACK, a $ZC_1(n-1)$ is transmitted on the first symbol. When a second bit of the two bits of ACK/NACK is transmitted, the $ZC_2(n)$ is transmitted on a second symbol; and when the second bit is the ACK, a $ZC_2(n-1)$ is transmitted on the second symbol.

A Seventh Preferred Embodiment

Figure 11:
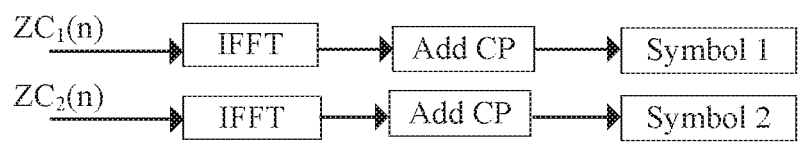
FIG. 11 is a first flowchart of a user transmitting predefined sequences on two transmission symbols according to a preferred embodiment of the present disclosure.
Figure 12:
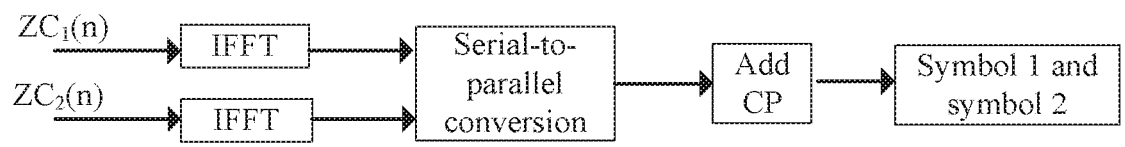
FIG. 12 is a second flowchart of a user transmitting predefined sequences on two transmission symbols according to a preferred embodiment of the present disclosure.

FIG. 11 is a first flowchart of a user transmitting predefined sequences on two symbols according to a preferred embodiment of the present disclosure; and FIG. 12 is a second flowchart of a user transmitting predefined sequences on two symbols according to a preferred embodiment of the present disclosure. Two implementation flows for transmitting predefined sequences on two symbols are given in FIG. 11 and FIG. 12. In FIG. 11, predefined sequences $ZC_1(n)$ and $ZC_2(n)$ are respectively subjected to IFFT, and then are cyclic prefix addition, and then are mapped onto two symbols within a TTI. In FIG. 12, after being subjected to the IFFT, the predefined sequences $ZC_1(n)$ and $ZC_2(n)$ are subjected to parallel-serial conversion, and then cyclic prefixes are added to the predefined sequences $ZC_1(n)$ and $ZC_2(n)$, and finally obtained serial data is sequentially mapped onto two symbols within the TTI. The benefit of FIG. 12 is that there is no CP on the second symbol, and the length of the CP on the first symbol may be increased or a certain blank sample may be reserved on the second symbol.

Through the description of the above implementations, those skilled in the art may clearly understand that the method according to the above embodiment may be implemented by means of software and a necessary general hardware platform, and certainly, can also be implemented by hardware, but in many cases the former is a better implementation. Based on such an understanding, the technical solution of the present disclosure, which is essential or contributes to the prior art, may be embodied in the form of a software product, where the computer software product is stored in a storage medium (such as a ROM/RAM, a disk, an optical disc), and includes a number of instructions for causing a terminal device (which may be a cell phone, a computer, a server, or a network device, and the like.) to perform the methods described in various embodiments of the present disclosure.

It should be noted that each of the above modules may be implemented by software or hardware. For the latter, the foregoing may be implemented by, but not limited to, the following manners: the foregoing modules are all located in the same processor; or, the modules are located in the multiple processors respectively.

An embodiment of the present disclosure further provides a storage medium. Alternatively, in the present embodiment, the above storage medium may be configured to store program codes for performing the following steps.

In step S1, M predefined sequences are transmitted on two transmission symbols within a transmission time interval.

In step S2, an acknowledgement (ACK) message or a negative acknowledgement (NACK) message is determined according to the M predefined sequences and mapping patterns of the M predefined sequences in a time domain and a frequency domain, where M is a positive integer.

Alternatively, the storage medium is further configured to store steps for performing methods in the above-described embodiments.

Alternatively, in the present embodiment, the above-described storage medium may include, but not limited to, a USB flash drive, a Read-Only Memory (ROM), a Random Access Memory (RAM), a mobile hard disk, a magnetic disk, an optical disk and other media that may store the program codes.

Alternatively, in the present embodiment, the processor performs steps of the methods in the foregoing embodiments according to the program codes which have been stored in the storage medium.

Alternatively, specific examples in the present embodiment may refer to examples described in the above-described embodiments and the optional implementations, and details will be omitted here.

It will be apparent to those skilled in the art that various modules or steps of the present disclosure described above may be implemented by a general-purpose computing apparatus, which may be centralized on a single computing apparatus or distributed across a network composed of multiple computing apparatuses. Alternatively, the various modules or steps may be implemented by program codes executable by the computing apparatus, such that the various modules or steps may be stored in a storage apparatus to be executed by the computing apparatus, and in some cases, steps shown or described may be performed in a sequence different from the sequence herein, or fabricated separately into individual integrated circuit modules, or a plurality of modules or steps thereof are fabricated as a single integrated circuit module. In this way, the present disclosure is not limited to any specific combination of hardware and software.

The above is only illustrative of the preferred embodiments of the present disclosure, and is not intended to limit the present disclosure, and various modifications and changes may be made to the present disclosure. Any modifications, equivalents, improvements, and the like made within the spirit and scope of the present disclosure are intended to be included within a protective scope of the present disclosure.

What is claimed is:

1. A method for transmitting an uplink control signal, comprising:

determining, according to the uplink control signal, two predefined sequences and mapping patterns of the two predefined sequences in a time domain and a frequency domain; and transmitting the uplink control signal on two transmission symbols of a transmission time interval, wherein the uplink control signal comprises an acknowledgment (ACK)/negative acknowledgement (NACK) message, wherein the two predefined sequences include a first predefined sequence and a second predefined sequence and the two transmission symbols comprises a first transmission symbol and a second transmission symbol, wherein the method is performed by at least one processor, wherein in response to determining that the uplink control signal is the 1-bit ACK message, the first predefined sequence is transmitted on the first transmission symbol and the second predefined sequence is transmitted on the second transmission symbol; and in response to determining that the uplink control signal is the 1-bit NACK message, the second predefined sequence is transmitted on the first transmission symbol and the first predefined sequence is transmitted on the second transmission symbol, in response to determining that the uplink control signal is 2 bits, the uplink control signal has four ACK/NACK status, mapping the four ACK/NACK status one by one to the following transmission manners according to different ACKs or NACKs: transmitting the first predefined sequence on the two transmission symbols within the transmission time interval; transmitting the second predefined sequence on the two transmission symbols; transmitting the first predefined sequence by the first transmission symbol and transmitting the second predefined sequence by the second transmission symbol; and transmitting the second predefined sequence by the first transmission symbol and transmitting the first predefined sequence by the second transmission symbol.

2. The method according to claim 1, wherein in response to determining that the uplink control signal is 1 bit, the first predefined sequence and the second predefined sequence are the same.

3. The method according to claim 1, wherein the first predefined sequences of different users are obtained by performing different time-domain cyclic shifts on a same base sequence; and the second predefined sequences of different users are obtained by performing different time-domain cyclic shifts on a same base sequence.

4. The method according to claim 1, wherein different cells are distinguished by adopting different base sequences for the predefined sequences.

5. The method according to claim 1, wherein a length of each of the two predefined sequences is a multiple of 12.

6. The method according to claim 1, wherein the two predefined sequences are mapped onto consecutive subcarriers in the frequency domain, and the number of the subcarriers occupied by the two predefined sequences is an integer multiple of 12.

7. The method according to claim 1, wherein in response to determining that the uplink control signal is 1 bit, the first predefined sequence and the second predefined sequence are different.

8. An apparatus for transmitting an uplink control signal, comprising:

a determiner configured to determine, according to the uplink control signal, two predefined sequences and mapping patterns of the two predefined sequences in a time domain and a frequency domain; and a transmitter configured to transmit the uplink control signal on two transmission symbols of a transmission time interval, wherein the uplink control signal is 1 bit or 2 bits, and comprises an acknowledgment (ACK)/negative acknowledgement (NACK) message, wherein the two predefined sequences comprise a first predefined sequence and a second predefined sequence, the two transmission symbols comprise a first transmission symbol and a second transmission symbol, and each of the first transmission symbol and the second transmission symbol includes a first frequency-domain position and a second frequency-domain position, wherein when the uplink control signal is the 1-bit ACK message, the first predefined sequence is transmitted on the first transmission symbol and the second predefined sequence is transmitted on the second transmission symbol; and when the uplink control signal is the 1-bit NACK message, the second predefined sequence is transmitted on the first transmission symbol and the first predefined sequence is transmitted on the second transmission symbol, or wherein when the uplink control signal is the 1-bit ACK message, the first predefined sequence is mapped to the first frequency-domain position of the first transmission symbol, and the second predefined sequence is mapped to the second frequency-domain position of the second transmission symbol; and when the uplink control signal is the 1-bit NACK message, the first predefined sequence is mapped to the second frequency-domain position of the first transmission symbol, and the second predefined sequence is mapped to the first frequency-domain position of the second transmission symbol.

9. The apparatus of claim 8, wherein when the uplink control signal is 2 bits, the uplink control signal has four ACK/NACK status, mapping the four ACK/NACK status one by one to the following transmission manners according to different ACKs or NACKs: transmitting the first predefined sequence on the two transmission symbols within the transmission time interval; transmitting the second predefined sequence on the two transmission symbols; transmitting the first predefined sequence by the first transmission symbol and transmitting the second predefined sequence by the second transmission symbol; and transmitting the second predefined sequence by the first transmission symbol and transmitting the first predefined sequence by the second transmission symbol.

10. The apparatus of claim 8, wherein when the uplink control signal is 2 bits, the uplink control signal has four ACK/NACK status, mapping the four ACK/NACK status one by one to the following transmission manners according to different ACKs or NACKs:

transmitting the first predefined sequence on the two transmission symbols within the transmission time interval; transmitting the second predefined sequence on the two transmission symbols; transmitting the first predefined sequence by the first transmission symbol and transmitting the second predefined sequence by the second transmission symbol; and transmitting the second predefined sequence by the first transmission symbol and transmitting the first predefined sequence by the second transmission symbol;

a first mapping pattern: the first predefined sequence is mapped to the first frequency-domain position of the first transmission symbol, and the second predefined sequence is mapped to the first frequency-domain position of the second transmission symbol;

a second mapping pattern: the first predefined sequence is mapped to the first frequency-domain position of the first transmission symbol, and the second predefined sequence is mapped to the second frequency-domain position of the second transmission symbol;

a third mapping pattern: the first predefined sequence is mapped to the second frequency-domain position of the first transmission symbol, and the second predefined sequence is mapped to the first frequency-domain position of the second transmission symbol;

a fourth mapping pattern: the first predefined sequence is mapped to the second frequency-domain position of the first transmission symbol, and the second predefined sequence is mapped to the second frequency-domain position of the second transmission symbol;

a fifth mapping pattern: the second predefined sequence is mapped to the first frequency-domain position of the first transmission symbol, and the first predefined sequence is mapped to the second frequency-domain position of the second transmission symbol; and a sixth mapping pattern: the second predefined sequence is mapped to the second frequency-domain position of the first transmission symbol, and the first predefined sequence is mapped to the first frequency-domain position of the second transmission symbol.

11. The apparatus of claim 10, wherein transmitting the ACK corresponds to a bit "1", and transmitting the NACK corresponds to a bit "0", wherein transmitting "0, 0", transmitting "0, 1", transmitting "1, 0" and transmitting "1, 1" are in a one-to-one correspondence with four of the six mapping patterns.

12. The apparatus of claim 8, wherein in response to determining that the uplink control signal is 1 bit, the first predefined sequence and the second predefined sequence are the same.

13. The apparatus of claim 8, wherein the first predefined sequences of different users are obtained by performing different time-domain cyclic shifts on a same base sequence; and the second predefined sequences of different users are obtained by performing different time-domain cyclic shifts on a same base sequence.

14. The method according to claim 13, wherein in response to determining that the uplink control signal is 2 bits, six mapping patterns include:

a first mapping pattern: the first predefined sequence is mapped to the first frequency-domain position of the first transmission symbol, and the second predefined sequence is mapped to the first frequency-domain position of the second transmission symbol;

a second mapping pattern: the first predefined sequence is mapped to the first frequency-domain position of the first transmission symbol, and the second predefined sequence is mapped to the second frequency-domain position of the second transmission symbol;

a third mapping pattern: the first predefined sequence is mapped to the second frequency-domain position of the first transmission symbol, and the second predefined sequence is mapped to the first frequency-domain position of the second transmission symbol;

a fourth mapping pattern: the first predefined sequence is mapped to the second frequency-domain position of the first transmission symbol, and the second predefined sequence is mapped to the second frequency-domain position of the second transmission symbol;

a fifth mapping pattern: the second predefined sequence is mapped to the first frequency-domain position of the first transmission symbol, and the first predefined sequence is mapped to the second frequency-domain position of the second transmission symbol; and a sixth mapping pattern: the second predefined sequence is mapped to the second frequency-domain position of the first transmission symbol, and the first predefined sequence is mapped to the first frequency-domain position of the second transmission symbol.

15. The method according to claim 14, wherein transmitting the ACK corresponds to a bit "1", and transmitting the NACK corresponds to a bit "0", wherein transmitting "0, 0", transmitting "0, 1", transmitting "1, 0" and transmitting "1, 1" are in a one-to-one correspondence with four of the six mapping patterns.

16. The apparatus of claim 8, wherein different cells are distinguished by adopting different base sequences for the predefined sequences.

17. The apparatus of claim 8, wherein a length of each of the two predefined sequences is a multiple of 12.

18. The apparatus of claim 8, wherein the two predefined sequences are mapped onto consecutive subcarriers in the frequency domain, and the number of the subcarriers occupied by the two predefined sequences is an integer multiple of 12.

19. A method for transmitting an uplink control signal, comprising:

determining, according to the uplink control signal, two predefined sequences and mapping patterns of the two predefined sequences in a time domain and a frequency domain; and transmitting the uplink control signal on two transmission symbols of a transmission time interval, wherein the uplink control signal is 1 bit or 2 bits, and comprises an acknowledgment (ACK)/negative acknowledgement (NACK) message, wherein the two predefined sequences comprise a first predefined sequence and a second predefined sequence, the two transmission symbols comprise a first transmission symbol and a second transmission symbol, and each of the first transmission symbol and the second transmission symbol includes a first frequency-domain position and a second frequency-domain position, wherein when the uplink control signal is the 1-bit ACK message, the first predefined sequence is mapped to the first frequency-domain position of the first transmission symbol, and the second predefined sequence is mapped to the second frequency-domain position of the second transmission symbol; and when the uplink control signal is the 1-bit NACK message, the first predefined sequence is mapped to the second frequency-domain position of the first transmission symbol, and the second predefined sequence is mapped to the first frequency-domain position of the second transmission symbol.

* * * * *